United States Patent [19]
Amagi et al.

[11] 3,899,547
[45] Aug. 12, 1975

[54] PROCESS FOR PREPARING VINYL CHLORIDE COMPOSITIONS CONTAINING BUTADIENE AND BUTADIENE-STYRENE COPOLYMERS

[75] Inventors: Yasuo Amagi, Tokyo; Haruhiko Yusa, Iwaki, both of Japan

[73] Assignee: Kureha Kogaku Kogyo Kabushiki Kaisha, Tokyo, Japan

[22] Filed: Jan. 4, 1974

[21] Appl. No.: 430,937

Related U.S. Application Data

[63] Continuation of Ser. No. 135,398, April 19, 1971, abandoned, which is a continuation-in-part of Ser. No. 753,602, Aug. 19, 1968, abandoned.

[30] Foreign Application Priority Data

Aug. 19, 1967  Japan .............................. 42-53212

[52] U.S. Cl.... 260/876 R; 260/23.7 A; 260/23.7 H; 260/23.7 M; 260/45.75 K; 260/880 R; 260/885
[51] Int. Cl. ...................... C08f 15/00; C08f 19/00
[58] Field of Search ........................ 260/876 R, 880

[56] References Cited
UNITED STATES PATENTS
3,558,841  1/1971  Dalton ............................ 260/880 R FOREIGN PATENTS OR APPLICATIONS
1,488,805  6/1967  France ........................... 260/876 R
1,446,487  6/1966  France ........................... 260/876 R
1,103,243  2/1968  United Kingdom............. 260/876 R

*Primary Examiner*—Richard B. Turer
*Attorney, Agent, or Firm*—Fitzpatrick, Cella, Harper & Scinto

[57] ABSTRACT

Vinyl chloride polymer compositions of improved transparency, impact strength, and workability obtained by blending a substantial quantity of vinyl chloride polymers containing vinyl chloride as the principal constituent thereof and a supplemental quantity of a resin produced from post-polymerization of a monomer mixture of styrene, methylmethacrylate, and a cross-linking agent on coagulated particles of a latex containing butadiene polymer or butadiene-styrene copolymer.

1 Claim, 4 Drawing Figures

ROLL TEMPERATURE 160°C

ROLL TEMPERATURE 175°C

ROLL TEMPERATURE 160 °C

ROLL TEMPERATURE 175 °C

PROCESS FOR PREPARING VINYL CHLORIDE COMPOSITIONS CONTAINING BUTADIENE AND BUTADIENE-STYRENE COPOLYMERS

REFERENCE TO RELATED APPLICATION

This is a continuation of application Ser. No. 135,398, filed Apr. 19, 1971, now abandoned, which, in turn, is a continuation-in-part of application Ser. No. 753,602, filed Aug. 19, 1968, now abandoned.

BACKGROUND OF THE INVENTION

This invention relates to vinyl chloride resin compositions and more particularly to new resin compositions of vinyl chloride having high transparency, high impact resistance, and excellent workability.

Heretofore, a method of improving the impact resistance of the product by admixing with polyvinyl chlorides so-called graft copolymers prepared by causing a vinyl monomer or a mixture of two or more monomers such as crylonitrile, styrene, and methyl methacrylate to undergo post-polymerization has been known.

U.S. Pat. No. 2857360 discloses the grafting of a monomer mixture of methyl methacrylate-styrene and methyl methacrylateacrylonitrile to polybutadiene; U.S. Pat. No. 3287443 discloses the grafting by post-polymerization of a monomer mixture of methyl methacrylate, acrylonitrile, and styrene to a butadiene-styrene copolymer; and French Pat. No. 1230489 discloses the polymerization of methyl methacrylate by itself with respect to a rubber of polybutadiene or butadiene-styrene-methyl methacrylate and the blending of the resulting polymer with polyvinyl chloride for the purpose of improving the quality.

Resin compositions for blending prepared by known processes, however, are accompanied by many shortcomings and are limited in their applications. For example, a certain resin composition may positively improve impact resistance but is deficient in producing transparency, or another resin composition may not impair the transparency of polyvinyl chlorides to a great extent but is deficient in imparting impact resistance. Furthermore, other compositions have low thermal stabilities and readily undergo coloration, while the use of certain resin compositions for blending imparts a purplish tinge to the product. Particularly in applications to packaging of food products, these compositions have the disadvantages of greatly lowering the commercial values of the packaged commodities.

On one hand, shaped or formed articles of impact-resistant polyvinyl chlorides of this character are known to exhibit the phenomenon of developing an extremely milky or whitened appearance in the neighbourhood of folds and bends formed in the articles. A further and serious disadvantage of resins for blending known heretofore has been the extreme deviations in the impact strengths of formed articles depending on the processing or working conditions. The reason for these deviations is probably the difference due to mixing and kneading in the degree of dispersion of the blending resins within the polyvinyl chloride.

SUMMARY OF THE INVENTION

It is an object of the present invention to overcome the above described difficulties heretofore accompanying the production of vinyl chloride polymer compositions.

More specifically, an object of the invention is to provide resin compositions for blendin which, when blended in minimum quantities to polyvinyl chlorides, impart high impact strength thereto even when the processing conditions are varied widely, and which impart to the polymers other excellent properties such as colorless and transparent state, high thermal stability, and absence or only very small degree of milky cloudiness due to bends in the product.

We have found that the objects of the invention can be readily achieved by mixing and processing from 1 to 20 parts by weight of blending resin hereinafter described with from 99 to 80 parts by weight of a polyvinyl chloride or a copolymer with vinyl chloride as the principal constituent thereof, whereby products of excellent properties as described above can be readily produced.

The nature, details, and utility of the invention will be more clearly apparent from the following detailed description beginning with general considerations and concluding with specific examples of preferred embodiment of the invention, when read in conjunction with the accompanying illustration.

DETAILED DESCRIPTION OF THE INVENTION

Figure 1:
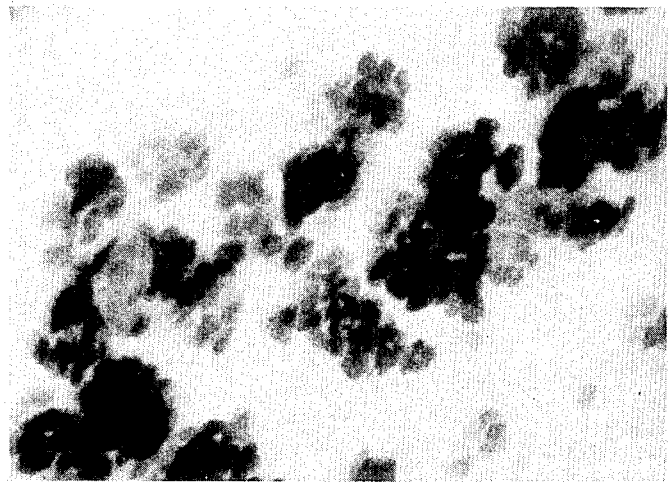
FIGS. 1 and 2 are electron microscopic photographs showing the character of dispersion of a resin for blending in a polyvinyl chloride at two kneading (roll) temperatures in the case of a resin composition according to the invention.

In accordance with the invention, a polybutadiene-styrene latex having a solid component of from 20 to 50 percent by weight and a pH value of 9.0 or higher and composed of polymer particles 95 percent of which are in the size range of from 0.05 to 0.15 micron is first prepared.

For obtaining the abovementioned rubber latex, there is usually employed the emulsion-polymerization of a monomer mixture of butadiene and styrene in the presence of a fatty acid type anion surface activating agent. Normally, surface active agent of anion, cation, or nonion type may be used as the emulsifier for the emulsion-polymerization of butadiene and styrene. However, from the standpoints of the physical property of the resultant rubber latex suitable for obtaining the PVC composition of the present invention, of the stability of the rubber latex after postpolymerization with the vinyl chloride polymers and of the uniform and effective coagulation of othe rubber latex when mixed, selection of the emulsifier to be used for the polymerization of the rubber components constitutes a very important factor.

With the above view points in mind, when the cationic or nonionic surfactants are used, there takes place various disadvantages which impair the commercial value of the obtained PVC composition such that required time for the rubber polymerization is prolongated, that the stability of the rubber latex is poor to cause deposition at the time or rubber polymerization as well as the post-polymerization with vinyl chloride, that bad smell remains with the resin product, and that some problems arise in production of such PVC composition. On the other hand, when the anionic surfactant such as dioctyl ester of sulphosuccinate, sulphonate of alkylbenzene sulphonic acid, etc. is used at the time of the initial polymerization, the polymerization speed is in fact increased and the stability of the latex becomes sufficient. However, when sulfate or sulfonic is added to the monomer mixture in such a large quantity that causes the micellar dispersion of the monomers in the emulsion polymerization, there arise problems such that the coagulation effect of rubber when it is to be coagulated by adding an acidic substance is prohibitively impaired with the result that the intended strength imparting effect with respect to vinyl chloride polymer cannot be improved, and heatstability of the resultant PVC composition is so poor as to affecting workability thereof.

It is therefore preferable from the standpoint of the physical property of the rubber latex and manufacture thereof to use the fatty acid salt type surfactant such as oleic acid salt, stearic acid salt, etc. Examples of the fatty acid salt surfactants useful for the present purpose are alkali metal salts of the fatty acids having 10 to 20 carbon atoms such as capric acid, lauric acid, myristic acid, palmitic acid, stearic acid, oleic acid, etc..

To this rubber latex, a coagulant is added to form coagulated rubber particles of an average particle size of from 0.2 to 0.5 micron. In this case, the aggregated or coagulated particle size in the diameter of each coagulated particle formed by the flocculation of spherical polymer particles.

Examples of coagulants added for obtaining coagulated particles of uniform average particle size are electrolytic substances generally used as coagulants for lateces, organic solvents, and acidic substances. Examples of suitable electrolytic substances are univalent ions such as sodium chloride and potassium chloride and divalent ions such as aluminum salts. Among organic solvents, methanol and ethanol are effective. We have found, however, that for producing even more uniform coagulated particles, the addition of an acidic substance produces good results. Examples of such acidic substances are mineral acids and organic acids such as hydrochloric acid, sulphuric acid, and nitric acid.

When an acid substance is added as a coagulant, it is necessary to add it gradually to a rubber latex to which a dispersion stabilizer has been added and to lower the pH value of the latex to from 8.5 to 2.0. When the pH value decreases below 2.0, the dispersion stability of the rubber latex becomes poor. For this reason, lumps of the process material are formed at a high rate, and precipitation products are undesirably formed in large quantity even at the time of post-polymerisation. The physical properties of a formed product produced by blending a blending resin prepared in this manner with a polyvinyl chloride are not readily reproducible. Furthermore, only products with numerous fish eyes can be produced.

The manner in which the dispersion stabiliser and acidic substance are added is also important for obtaining uniform coagulated particles. We have found that sulphonates such as dioctyl ester sulphosuccinate and alkylbenzene sulphonate are suitable for the dispersion stabilizer when added in a quantity of from 0.05 to 0.5 percent by weight with respect to the solid component.

When more than 0.5 percent of the dispersion stabilizer is added, the coagulating action due to the acidic substance is poor, and the impact strength of the resulting resin composition cannot be improved. Moreover, the resin composition has poor thermal stability and tends to become colored. On the other hand, when less than 0.05 percent is added, the precipitation quantity when the acidic substance is added is large.

We have found that when the acidic substance is added to the rubber latex, a low rubber latex concentration and a low acidic substance concentration produce good results, and it is preferable to carry out the adding process gradually with uniform agitation.

Before carrying out post-polymerisation of styrene, methyl methacrylate and cross-linking agent on a coagulated rubber latex obtained in the above-described manner, it is necessary to return the pH of the emulsion to an alkaline state by adding an aqueous solution of caustic soda or caustic potash.

In the practice of the invention, the proportions of the rubber and plastics components constituting the polymer resins are also important. Of course if only the impact resistance were a problem, a maximum quantity of the rubber component would be desirable. An extremely large quantity of the rubber component, however, gives rise to the formation of lumps in the acid precipitation or salting-out process and, moreover, in the drying process, or has a detrimental effect also in the step of blending with the polyvinyl chloride, the result being that a uniform dispersion cannot be attained.

On the other hand, when the content of the rubber component is less than 40 percent by weight, its effect in imparting impact resistance is small, and this rubber component must be blended with the polyvinyl chloride in a large quantity (20 percent by weight or more). This necessity is uneconomical. Moreover, this necessity results in a great effect on the other physical properties of the polyvinyl chloride.

As a result, the desirable compositional ratio by weight of the rubber component and the plastics component is (40 to 70)/(60 to 30).

An independent polymer of butadiene or a butadiene-styrene copolymer is used as the rubber component, and we have found that a quantity of the styrene in the latter rubber component of less than 30 percent by weight produces good results.

The post-polymerisation of the plastics component of from 60 to 30 parts by weight is carried out by the procedure of dividing the post-polymerization monomer ingredients into from 50 to 90 percent by weight of a monomer mixture of styrene, as the principal constituent, and methyl methacrylate and from 50 to 10 percent by weight of methyl methacrylate singly or a monomer mixture of methyl methacrylate, as the principal constituent, and styrene, first causing the former substance to undergo adsorption polymerisation in the presence of a small quantity of a cross linking agent to form a coagulated rubber latex, then causing the latter substance to undergo adsorption polymerisation in the presence of a small quantity of a cross-linking agent.

For the cross-linking agent, a substance which copolymerises well with styrene-methyl methacrylate should be selected. Examples of such substances are mono-, di-, tri-, and tetraethylene glycol dimethacrylates, 1,3-butylene glycol dimethacrylate, and divinyl benzene. The quantity of the cross-linking agent added is from 0.01 to 5 parts by weight with respect to the monomers.

The polyvinyl chlorides which can be used in accordance with the invention are independent polymers produced by known methods such as emulsion polymerisation and suspension-polymerisation and, in addition, can be in the form of copolymers or mixtures of 70 percent or more of vinyl chloride and another mono-olefin monomer copolymerisable therewith. With from 90 to 80 parts by weight of a polyvinyl chloride as defined above, from 1 to 20 parts by weight of the aforementioned resin for blending is blended.

The blending can be accomplished, in general, with the materials in powder state by means of mixing machine such as a roll mill or a Banbury mixer. On the other hand, the latex obtained in this invention and the polyvinyl chloride can be blended, and the resulting blend is subjected to salting-out or acid precipitation or is spray dried thereby to produce a blended resin composition.

In order to indicate still more fully the nature and utility of the invention, the following examples of specific procedure constituting preferred embodiments of the invention and results are set forth, it being understood that these examples are presented as illustrative only and that they are not intended to limit the scope of the invention.

EXAMPLE 1

A 10-litre, stainless-steel autoclave with agitator was charged with a monomer mixture of 800 grammes (g.) of butadiene, 200 g. of styrene, and 3.0 g. of divinylbenzene, and 3,000 g. of distilled water containing therein, 1.0 g. of potassium persulphate 10.0 g. of potassium oleate, 0.05 g. of EDTA-sodium salt, 0.5 g. of a sodium sulfoxylate compound sold under the trademark "Rongalite", 0.03 g. of $FeSO_4 \cdot 7H_2O$, and 1.5 g. of sodium pyrophosphate. This charge was caused to react at a temperature of 40°C for 17 hours, at which time no further drop in pressure was observable. As a result, a rubber latex of a solid component of 25 percent and a pH value of 9.2 was obtained in a polymerisation yield of 98 percent.

To this latex, 50 g. of a 2-percent aqueous solution of dioctyl ester sulphosuccinate was added, and the resulting latex was agitated for 10 minutes, after which a 0.5-percent aqueous solution of sulphuric acid was added gradually thereto to lower the pH value to 7.0, and the latex was agitated in this state for a further 10 minutes. A 0.5-percent aqueous solution of caustic soda was further added to bring the latex pH value to 10.0.

To this rubber latex, a monomer mixture of 400 g. of styrene containing 8 g. of divinyl benzene and 200 g. of methyl methacrylate, 0.6 g. of potassium persulphate, 0.2 g. of Rongalite, and 10 g. of an aqueous solution containing 0.6 g. of sodium pyrophosphate were added. The temperature of the resulting batch was then raised from 40°C to 50°C, and the batch was caused to react for 5 hours. Then 300 g. of methyl methacrylate containing 8 g. of divinyl benzene, 0.3 g. of potassium persulphate, 0.15 g. of Rongalite, and 0.1 g. of sodium pyrophosphate were further added to the latex, and the resulting batch was caused to react for further 7 hours. The latex thus obtained contained a solid component of 38 percent.

This latex was diluted with distilled water until its solid component concentration become 15 percent by weight and, with a 1-percent hydrochloric acid solution added thereto, was subjected to acid precipitation at 50°C. The resulting material was then heat-treated at 80°C to coagulate the particles thereof and then subjected to filtration, and drying in desiccated air at 70°C. In this manner, a resin for blending in powder form was obtained with a yield of 98.5 percent.

15 parts by weight of this resin was mixed with 85 parts by weight of a polyvinyl chloride of a degree of polymerisation of 800 containing 2 parts of dibutyl tin laurate, and the mixture was kneaded for 3 minutes by rolls at 160°C. The kneaded mixture was then pressed for 5 minutes under a pressure of 150 kg./cm$^2$ and at a temperature of 200°C to form a plate of 3-mm. thickness.

The light transmission of this plate was 81.0 percent, and the haze value was 4.5 percent as measured in accordance with the specification of Japanese Industrial Standards Designation JIS K–6714. Furthermore, a 6-mm. plate obtained by the same process as described above was subjected to an Izod impact test with a V-notch and found to have no Izod impact strength of 50 kg.cm/cm$^2$, and when a 1-mm. plate was bent through 90° of angle, almost no white cloudiness was observable.

Resin for blending was prepared in accordance with the procedure set forth in Example 1 except for the use of 10.0 gr. of dioctyl ester sulfosuccinate from the initial stage of polymerization of butadiene and styrene in place of potassium oleate. 15 parts of each of the resins thus prepared was blended with 85 parts by weight of a polyvinyl chloride to produce a resin composition of physical properties as indicated in Table 1 as Reference Example 1.

The heat stability of this resin composition was remarkably inferior to that wherein potassium oleate is used, and no increase in the strength imparting effect thereof could be recognized by the addition of acidic substance.

EXAMPLES 2, 3, and 4 resins for blending were prepared by polymerisation process similar to that set forth in Example 1 except for variation in the pH value in the acid treatment. 15 parts by weight of each resin thus prepared and 85 parts by weight of a polyvinyl chloride were blended to produce a resin composition. The physical properties of these resin compositions designated as Examples 2, 3, and 4 are shown in the appended Table 2, which also indicates as Reference Example 2 the properties of a resin composition obtained without any acid treatment whatsoever.

In this Reference Example 2, in which coagulated particles are not formed, there is a rapid drop in strength with rolls at relatively high temperature. On the other hand, in the case of kneading of a resin prepared with acid treatment and a polyvinyl chloride, the strength does not particularly drop with the high roll kneading temperature but exhibits an unusually high value.

EXAMPLE 5

A 10-litre, stainless-steel autoclave with an agitator was charged with a monomer mixture of 800 g. of butadiene, 240 g. of styrene, and 10.4 g. of divinyl benzene, 2.08 g. of diisopropyl benzene hydroperoxide, 10.4 g. of potassium oleate, 0.052 g. of EDTA-sodium salt, 0.52 g. of Rongalite, 0.031 g. of $FeSO_4 \cdot 7H_2O$, and 3,120 g. of distilled water containing 1.73 g. of sodium pyrophosphate. The charge was caused to react at 40°C for 17 hours, at which time no further drop in pressure was observable. As a result, a rubber latex of a solid component concentration of 25 percent and a pH value of 9.1 was obtained in a polymerisation yield of 98 percent.

To this latex, 52 g. of a 2-percent aqueous solution of dioctyl ester sulphosuccinate was added, and the resulting latex was agitated for 10 minutes, after which a 0.5-percent aqueous solution of sulphuric acid was added gradually thereto to lower the pH value to 7.2, and the latex was agitated in this state for a further 10 minutes. A 0.5-percent aqueous solution of caustic soda was further added to the latex to bring its pH value to 10.0.

To this rubber latex, a monomer mixture of 240 g. of styrene containing 1.0 g of divinylbenzene and 200 g. of methyl methacrylate, 0.44 g. of diisopropyl benzene hydroperoxide, 0.22 g. of Rongalite, and 10 g. of an aqueous solution containing 0.66 g. of sodium pyrophosphate were added. The temperature of the resulting batch was raised from 40°C to 50°C, and the batch was caused to react for 5 hours. Then 120 g. of methyl methacrylate containing 0.3 g. of divinylbenzene, 0.12 g. of potassium persulphate, 0.06 g. of Rongalite, and 10 g. of an aqueous solution containing 0.12 g. of sodium pyrophosphate were further charged, and the resulting latex was caused to react for 7 hours, whereupon a latex having a 34-percent solid content was obtained.

Ths latex was diluted with distilled water until its solid component concentration became 15 percent by weight and, with a 1-percent hydrochloric acid solution added thereto, was subjected to acid precipitation at 50°C. The resulting material was then heat-treated at 80°C to coagulate the particles thereof and then subjected to filtration, and drying in dried air at 70°C.

15 parts by weight of the resin for blending prepared in the above described manner was blended with 85 parts by weight of a polyvinyl chloride to produce a resin composition having physical properties as indicated in the appended Table 4.

EXAMPLES 6, 7, and 8

Resins for blending were prepared by polymerisation in accordance with the procedure set forth in Example 5 except for variations in the quantity (as indicated in the appended Table 3) of the crosslinking agent added at the time of post-polymerisation. 15 parts by weight of each of these resins was admixed with 85 parts by weight of a polyvinyl chloride to produce a resin composition, the physical properties of which are indicated in Table 4.

A resin composition sample was produced without the addition of a cross-linking agent at the time of post-polymerisation and designated as Reference Example 3. As indicated in Table 4, the transparency of this resin composition is poor, and, moreover, its whitening at bends is excessive.

The impact strength of a resin composition produced by the blending of a resin for blending prepared without acid precipitation and a polyvinyl chloride is greatly affected by the kneading temperature thereof.

EXAMPLES 9 and 10

Resins for blending were prepared in accordance with the procedure set forth in Example 5 except for the use of monoethylene glycol dimethacrylate instead of divinylbenzene as of the crosslinking agent and variation in the additive quantity. 15 parts of each of the resins thus prepared was blended with 85 parts of a polyvinyl chloride to produce a resin composition of physical properties as indicated in Table 4. Almost no difference due to change in the cross-linking agent in the physical properties of the resin composition could be discerned.

The nature and degree of dispersion in a polyvinyl chloride of the resins for blending prepared as in Example 8 and Reference Example 4 were examined for the cases of kneading temperatures of 160°C and 175°C by means of an electron microscope. Photographs of the respective results are shown in FIGS. 1, 2, 3, and 4.

Figure 2:
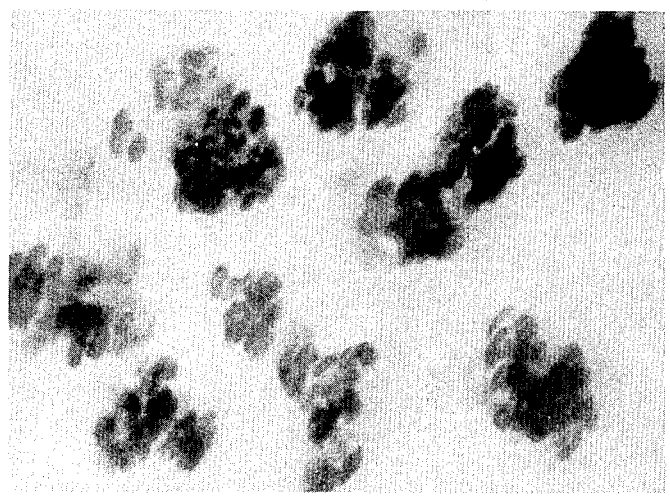
Figure 3:
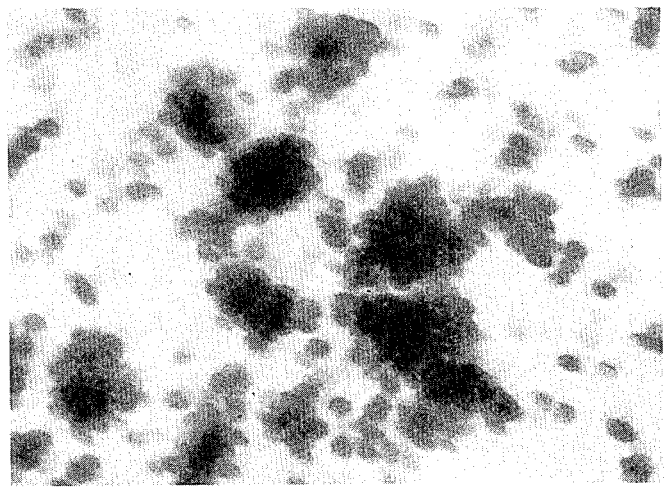
FIGS. 3 and 4 are similar photographs in the case of a reference example as described hereinafter.
Figure 4:
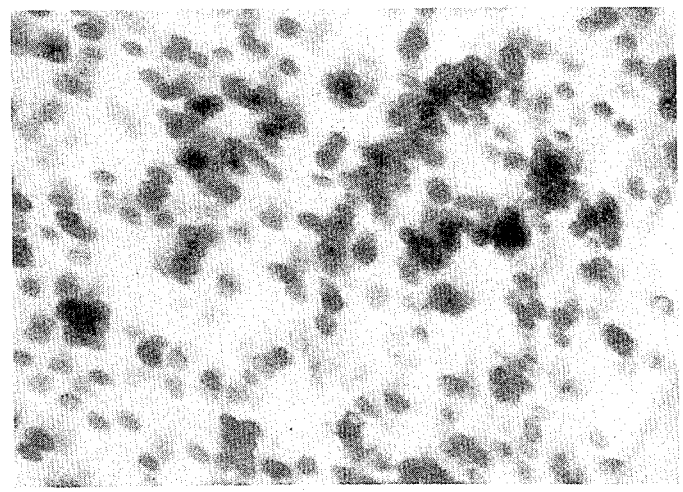

The degree of dispersion of the resin for blending prepared in Reference Example 4 differs with the kneading temperature as indicated in FIGS. 3 and 4, the dispersion units tending to diminish in size with temperature. On the other hand, a resin prepared by the method of the invention, wherein the particles are coagulated beforehand by acid treatment, does not exhibit a great variation due to the kneading temperature of the size of the dispersion units as indicated in FIGS. 1 and 2.

EXAMPLE 11

A 10-litre, stainless-steel autoclave with agitator was charged under the vacuum condition with a monomer mixture of 800gr. of butadiene, 240 gr. of styrene, 10.4 gr. of divinylbenzene, and 2.08 gr. of diisopropyl benzene hydroperoxide, and 3,060 gr. of distilled water containing therein 10.4 gr. of sodium stearate, 0.052 gr. of EDTA-sodium salt, 0.52 gr. of sodium formaldehyde sulfoxylate. 0.031 gr. of $FeSO_4.7H_2O$, and 1.73 gr. of sodium pyrophosphate. This charge was caused to react at a temperature of 45°C until no further drop in pressure became observable. As a result, a rubber latex of a solid component of 25 % and a pH value of 9.0 was obtained.

To this latex, 50 gr. of 2-percent aqueous solution of alkylbenzene sodium sulfonate was added, and the batch was agitated for 10 minutes, after which a 0.5-percent aqueous solution of sulfuric acid was added gradually thereto to lower the pH value to 7.0. In this state, the latex was further agitated for another 10 minutes. Thereafter, 0.5-percent aqueous solution of caustic soda was further added to bring the pH value of the latex to 10.0.

To this rubber latex, a monomer mixture of 240 gr. of styrene, and 200 gr. of methylmethacrylate containing therein 1.0 gr. of divinyl benzene and 0.44 gr. of diisopropyl benzene hydroperoxide, and 10 gr. of an aqueous solution containing 0.22 gr. of sodium formaldehyde sulfoxylate were added, and the batch was caused to react for 5 hours by raising the temperature thereof from 45°C to 60°C.

Furthermore, 120 gr. of methylmethacrylate containing 0.12 gr. of diisopropyl benzene hydroperoxide and 0.3 gr. of divinylbenzene, and 10 gr. of an aqueous solution containing 0.06 gr. of sodium formaldehyde sulfoxylate were added to the latex, and the whole batch was caused to react for 7 hours.

The resulting rubber latex was subjected to acid precipitation followed by a heat-treatment, thereafter it was filtered, dehydrated, and washed well with distilled water, and finally dried in desiccated air at 70°C.

15 parts by weight of the resin for blending in powder form thus obtained was mixed with 85 parts by weight of polyvinyl chloride containing therein 2 parts by weight of dibutyl tin maleate as a stabilizer, and the mixture was kneaded for 3 minutes by rolls at 160°C. The kneaded mixture was then pressed for 5 minutes under a pressure of 150 kg./cm$^2$ and at a temperature of 200°C to form a plate of 3-mm thickness.

The light transmission of this plate was 81.0 percent, and the haze value was 4.5 percent as measured in accordance with the specification of Japanese Industrial Standard Designation JIS K–6714. Furthermore, a 6-mm plate obtained by the same process as described above was subjected to an Izod impact test with a V-notch and found to have an Izod impact strength of 50 kg/cm$^2$, and when a 1-mm plate was bent through 90° of angle, almost no white cloudiness was observable.

TABLE 1

| EXAMPLE | TREAT-MENT pH | STRESS WHITEN-ING THROUGH BENDING | TRANS-PARENCY (%) | FISH EYES | IZOD IMPACT STRENGTH (V-notch) | | HEAT STABILITY (Time taken for blacking) |
|---|---|---|---|---|---|---|---|
| | | | | | 160°C ROLL | 170°C ROLL | |
| Example 1 | 7.0 | none | 81.0 | few | 50 | 45 | 80 min. |
| Ref. Example 4 | 7.0 | none | 80.5 | few | 33 | 5 | 30 min. |

* 15 parts by weight of the respective resins for blending were added to 85 parts by weight each of polyvinyl chloride resin (P.D. 800) containing therein 2 parts by weight of a butyl-tin stabilizer, and the mixture was kneaded for 3 minutes by a test roll at a kneading temperature of 160° to form sample sheets. The sample sheets were tested in a Geer's oven at 180°C to find out length of time until the resin composition turned to black in color.

TABLE 2

| SAMPLE | ACID TREAT-MENT pH | WHITEN-ING DUE TO BEND-ING | TRANS-PARENCY (%) | FISH-EYES | IZOD IMPACT STRENGTH (V - notch) | |
|---|---|---|---|---|---|---|
| | | | | | 160°C ROLL | 175°C ROLL |
| Example 1 | 7.0 | none | 81.0 | few | 50 | 45 |
| Example 2 | 6.5 | " | 80.5 | few | 52 | 43 |
| Example 3 | 4.5 | " | 80.2 | few | 68 | 58 |
| Example 4 | 2.7 | " | 79.5 | many | 85 | 85 |
| Ref. Example 2 | no treatment (9.2) | " | 82.0 | few | 30 | 4 |

TABLE 3

| SAMPLE | RUBBER COMPONENT | | | PLASTICS COMPONENT (first stage post-polymerization) | | | PLASTICS COMPONENT (second stage post-polymerization) | |
|---|---|---|---|---|---|---|---|---|
| | Buta-diene (parts) | Styrene (parts) | Divinyl-benzene (parts) | Styrene (parts) | Methyl meth-acrylate (parts) | Divinyl-benzene (parts) | Methyl meth-acrylate (parts) | Divinyl-benzene (parts) |
| Ref. Example 3 | 40 | 12 | 0.52 | 12 | 10 | 0 | 6 | 0 |
| Example 5 | 40 | 12 | 0.52 | 12 | 10 | 0.05 | 6 | 0.015 |
| Example 6 | 40 | 12 | 0.52 | 12 | 10 | 0.1 | 6 | 0.03 |
| Example 7 | 40 | 12 | 0.52 | 12 | 10 | 0.2 | 6 | 0.06 |
| Example 8 | 40 | 12 | 0.52 | 12 | 10 | 0.07 | 6 | 0.03 |
| Ref. Example 4 | 40 | 12 | 0.52 | 12 | 10 | 0.07 | 6 | 0.07 |
| Example 9 | 40 | 12 | * 0.79 | 12 | 10 | * 0.05 | 6 | * 0.023 |
| Example 10 | 40 | 12 | * 0.79 | 12 | 10 | * 0.10 | 6 | * 0.045 |
| Example 11 | 40 | 12 | 0.52 | 12 | 10 | 0.05 | 6 | 0.015 |

TABLE 4

| SAMPLE | TREAT-MENT pH | STRESS WHITEN-ING DUE TO BENDING | TRANS-PARENCY (%) | "FISH-EYES" | IZOD IMPACT STRENGTH (V notch) | |
|---|---|---|---|---|---|---|
| | | | | | 160°C ROLL | 175°C ROLL |
| Ref. Example 3 | 7.2 | excessive | 7.5 | many | 85 | 75 |
| Example 5 | 7.2 | none | 80.0 | few | 80 | 73 |
| Example 6 | 7.2 | none | 81.8 | few | 75 | 65 |
| Example 7 | 7.2 | none | 82.0 | few | 70 | 62 |
| Example 8 | 7.2 | none | 80.0 | few | 78 | 67 |
| Ref. Example 4 | no treatment (9.2) | none | 82.0 | few | 55 | 10 |
| Example 9 | 7.2 | none | 79.5 | few | 80 | 70 |
| Example 10 | 7.2 | none | 81.0 | few | 75 | 66 |
| Example 11 | 7.0 | none | 80.5 | few | 82 | 75 |

What we claim is:

1. A process for producing a vinyl composition of high transparency, heat-stability, and impact strength, which comprises:
   a. adding to 100 parts by weight of a solid content of a latex containing from 40 to 70 parts by weight of a substance selected from the group consisting of butadiene polymers and butadiene-styrene copolymers, with butadiene as the principal constituent and a fatty acid surfactant having 10 to 20 carbon atoms as an emulsifier for preparing the latex, 0.05 – 0.5 parts by weight of a dispersion stabilizer selected from the group consisting of dioctyl ester sulphosuccinate and alkylbenzene sulphonate;
   b. adding to said stabilized latex as acidic substance to produce coagulated particles having average particle size of from 0.2 to 0.5 micron;
   c. dividing a plastic component to be post-polymerized in a proportion of from 60 to 30 parts by weight with said coagulated particles into
      1. from 50 to 90 percent by weight of a first portion which is a monomer mixture of styrene and methyl methacrylate with styrene as its principal constituent and
      2. from 50 to 10 percent by weight of a second portion selected from the group consisting of methylmethacrylate monomer and monomer mixture of styrene and methyl methacrylate with methyl methacrylate as the principal constituent;
   d. causing post-polymerization of said first portion of the plastic component with said coagulated particles in the presence of from 0.01 to 5 parts by weight of a crosslinking agent;
   e. then causing post-polymerization of said second portion on said post-polymerized first portion in the presence of from 0.1 to 5 parts by weight of a cross-linking agent thereby to prepare a resin; and
   f. blending from 1 to 20 percent by weight of said resin with from 99 to 80 percent by weight of a substance selected from the group consisting of polyvinyl chloride and copolymers containing vinyl chloride as the principal constituent thereof.

* * * * *

UNITED STATES PATENT OFFICE
CERTIFICATE OF CORRECTION

Patent No. 3,899,547          Dated August 12, 1975

Inventor(s) YASUO AMAGI, ET AL

It is certified that error appears in the above-identified patent and that said Letters Patent are hereby corrected as shown below:

Column 1, line 21, "crylonitrile" should read --acrylonitrile--

Column 2, line 2, "blendin" should read --blending--

Column 2, line 54, "othe" should read -- the--

Column 2, line 64, "time or" should read --time off--

Column 3, line 6, "sulfonic" should read - sulfonate--

Column 6, line 40, "resins for" should read --Resins for--

Column 7, line 30, "Ths" should read --This--

Column 10, in Table 1, in the heading, "HEAT STABILITY( )" should read

--HEAT STABILITY (*)--

Column 9, Table 1, below the Table, "( )15 parts" should read

--(*)15 parts--

Column 10, beneath TABLE 3 insert --* Monoethylene glycol dimethacrylate used.--

Column 11, line 15 in claim 1, "as acidic" should read --and acidic--

UNITED STATES PATENT OFFICE
CERTIFICATE OF CORRECTION

Patent No. 3,899,547  Dated August 12, 1975

Inventor(s) Yasuo Amagi et al.  Page - 2

It is certified that error appears in the above-identified patent and that said Letters Patent are hereby corrected as shown below:

Column 2, line 22, "embodiment" should read -- embodiments --.

Column 3, line 53, "polymerisation" should read -- polymerization --. Column 4, line 12, line 45, line 54 and 57, "polymerisation" should read -- polymerization --. Column 5, line 2, both occurrence, line 39, "polymerisation" should read -- polymerization --. Column 5, line 27, "grammes" should read -- grams --. Column 5, line 64, "become" should read -- became --. Column 7, line 4, line 48 and line 55, in each "polymerisation" should read -- polymerization --.

Signed and Sealed this second Day of December 1975

[SEAL]

Attest:

RUTH C. MASON  
Attesting Officer

C. MARSHALL DANN  
Commissioner of Patents and Trademarks